US012768355B2

(12) United States Patent
Van Praet

(10) Patent No.: US 12,768,355 B2
(45) Date of Patent: Oct. 20, 2026

(54) MOBILE OIL-FREE MULTI-STAGE COMPRESSOR DEVICE AND METHOD FOR CONTROLLING SUCH COMPRESSOR DEVICE

(71) Applicant: ATLAS COPCO AIRPOWER, NAAMLOZE VENNOOTSCHAP, Wilrijk (BE)

(72) Inventor: Stephan Van Praet, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 28 days.

(21) Appl. No.: 18/273,802

(22) PCT Filed: Mar. 1, 2022

(86) PCT No.: PCT/IB2022/051768
§ 371 (c)(1),
(2) Date: Jul. 24, 2023

(87) PCT Pub. No.: WO2022/185189
PCT Pub. Date: Sep. 9, 2022

(65) Prior Publication Data

US 2024/0084728 A1 Mar. 14, 2024

(30) Foreign Application Priority Data

Mar. 2, 2021 (BE) .................................. 2021/5150

(51) Int. Cl.
*F02B 29/04* (2006.01)
*F02B 39/10* (2006.01)
(Continued)

(52) U.S. Cl.
CPC ....... *F04C 29/04* (2013.01); *F02M 35/10393* (2013.01); *F04C 23/001* (2013.01);
(Continued)

(58) Field of Classification Search
CPC ........ F04C 23/02; F04C 23/001; F04C 28/02; F04C 29/04; F04C 2270/195; F02M 35/10393
(Continued)

(56) References Cited

U.S. PATENT DOCUMENTS 9,951,763 B2 4/2018 Hritz
2003/0021701 A1* 1/2003 Kolodziej ........... F04D 29/5826
417/243
(Continued)

FOREIGN PATENT DOCUMENTS

CN 110939571 A 3/2020
DE 10117790 A1 10/2002
(Continued)

OTHER PUBLICATIONS

English Translation of EP 3020972 A1 (Year: 2016).*
(Continued)

*Primary Examiner* — Connor J Tremarche
(74) *Attorney, Agent, or Firm* — BACON&THOMAS, PLLC

(57) ABSTRACT

Mobile oil-free multi-stage compressor device which includes at least a low-pressure stage compressor element with an inlet and an outlet and a high-pressure stage compressor element with an inlet and an outlet, wherein the outlet of low-pressure stage compressor element is connected to the inlet of the high-pressure stage compressor element through a line. The line includes an intercooler which is provided with a controllable fan. In addition, the compressor device is provided with a control unit that is configured to control a controllable fan to control the temperature at an outlet of the intercooler on the basis of the dewpoint in the line.

10 Claims, 2 Drawing Sheets

(51) Int. Cl.

| | |
|---|---|
| ***F02M 35/10*** | (2006.01) |
| ***F04C 23/00*** | (2006.01) |
| ***F04C 23/02*** | (2006.01) |
| ***F04C 28/02*** | (2006.01) |
| ***F04C 29/04*** | (2006.01) |

(52) U.S. Cl.
CPC .............. *F04C 23/02* (2013.01); *F04C 28/02* (2013.01); *F04C 2270/195* (2013.01)

(58) Field of Classification Search
USPC .......................................................... 417/244
See application file for complete search history.

(56) References Cited

U.S. PATENT DOCUMENTS

| | | | | |
|---|---|---|---|---|
| 2006/0130501 | A1 † | 6/2006 | Singh | |
| 2009/0016921 | A1 † | 1/2009 | Fujimoto | |
| 2009/0123302 | A1 † | 5/2009 | Nishimura | |
| 2012/0192710 | A1 | 8/2012 | Moore et al. | |
| 2018/0223876 | A1 * | 8/2018 | Martin | F04F 5/46 |
| 2019/0229598 | A1 | 7/2019 | Wang et al. | |

FOREIGN PATENT DOCUMENTS

| | | | | | |
|---|---|---|---|---|---|
| EP | 3020972 | A1 * | 5/2016 | B01D 53/261 |
| FR | 781209 | A | 1/1934 | |
| GB | 2034818 | A * | 6/1980 | F04B 41/06 |
| TW | M562337 | U | 6/2018 | |
| WO | WO-2020065504 | A1 * | 4/2020 | F04B 25/00 |
| WO | WO-2020065506 | A1 * | 4/2020 | F04B 25/00 |

OTHER PUBLICATIONS

International Search Report and Written Opinion in corresponding PCT Application No. PCT/IB2022/051768, dated Jun. 20, 2022.
BE Search Report in corresponding BE Application No. 202105150, dated Nov. 10, 2021.
First Office Action cited in Chinese Appln. No. 202280017114.X dated Dec. 6, 2025 with English translation.

* cited by examiner
† cited by third party

MOBILE OIL-FREE MULTI-STAGE COMPRESSOR DEVICE AND METHOD FOR CONTROLLING SUCH COMPRESSOR DEVICE

The present invention relates to a mobile oil-free multi-stage compressor device.

BACKGROUND OF THE INVENTION

It is known that mobile compressor devices need to be designed as compact as possible.

Apart from compactness, other considerations are relevant, such as the fact that for practical reasons such a compressor device is cooled with the aid of an air-air cooler with a fan rather than a water-air cooler. In addition, to date such a compressor device is driven by an internal combustion engine, for instance a diesel engine, to ensure independence of the availability of an electric power network.

It is also known that for a multi-stage oil-free compressor device an intercooler is included for cooling down the first low-pressure stage of compressed air before it is sent to the second stage in order to prevent overheating of the second high-pressure stage. After all, such high temperatures that may occur will be detrimental to the coating of the compressor rotors. In addition, such intercooling is beneficial to the energy consumption of the machine.

On the other hand, in some cases oil injection is also used for oil-injected compression devices to cool the compressed air. Yet because of the oil-free applications, an intercooler is opted for.

In mobile multi-stage oil-free compression devices, an air-air cooler is used in all cases rather than for instance an air-water cooler, because the latter requires a water supply, which is not feasible for mobile compressor devices.

The air-air cooler is provided with a fan with a fixed speed ratio relative to the combustion engine, which fan is driven by the combustion engine by means of a transmission device, for instance a belt transmission. This is a compact, simple setup.

If the compressed air with a quantity of absorbed humidity cools too strongly, and the gas temperature drops below the gas dewpoint, condensate will develop in the gas.

If this condensate ends up in the next compressor stage, this will damage the coating of the rotors of the high-pressure compressor element.

Although it is possible to provide a water separator or condensate separator between the two compression stages, this is not recommended for a mobile multi-stage compressor device because such a water separator is too bulky and, moreover, it is not always 100% effective and still the possibility exists that condensate ends up in the next compressor stage.

For that reason, it is opted for to select the air-air cooler in such a way that, in particular, the speed or the rpm of the fan is selected in such a way that the air to be cooled after the cooler will under no circumstances drop below the dewpoint. In other words: the fan is designed with a view to a worst-case scenario of a tropical setting, so for a high temperature and a maximum relative humidity.

That way it can be avoided at all times that condensate develops and at the same time still sufficient cooling is provided, so the coating of the compressor rotor is not exposed to too high temperatures or condensate.

As a consequence of the above, such known installations have the disadvantage that under some conditions, for instance at a low relative humidity, the compressed gas could be cooled down even further without the risk of the development of condensation.

Consequently, in some cases the compressor device will not be performing at its optimum efficiency. That is because the lower the temperature of the gas that enters the next high-pressure stage, the better the efficiency will be.

Moreover, since it is not known in advance at what site the mobile oil-free multi-stage compressor device will be used and the fan has been designed for the worst-case scenario of a tropical climate with a high dewpoint, in most cases the multistage compressor device will not be performing at its optimum efficiency.

Another disadvantage is, that when the mobile oil-free multi-stage compressor device is used at an elevated site, the input pressure is lower, so the pressure after the first low-pressure stage will also be lower. However, the second stage will still compress the gas to the same preset pressure so the pressure drop across the second stage will be higher and, consequently, the outlet temperature will also be higher, which may cause overheating of the second stage, resulting in negative consequences for the coating of the compressor rotors.

However, since the intercooling is designed for said tropical conditions with a high dewpoint, at an elevated level, with usually also a lower relative humidity and dewpoint, the cooling rate will be insufficient for the above second stage heat problem.

The various limitations connected with a mobile oil-free multi-stage compressor device as regards compactness, the lack of the possibility to be able to inject oil or any other fluid for cooling into the compressor elements and the fact that at all times it must absolutely be avoided that condensate ends up in the compressor elements to protect the coating, have been reason that to date such a mobile oil-free multi-stage compressor device has never been able to perform at its optimum efficiency. After all, to date no compact solution exists which can guarantee both that the coating of the compressor rotors is sufficiently protected against heat or condensate and that the compressor device performs at its maximum efficiency.

SUMMARY OF THE INVENTION

The present invention aims at providing a solution to at least one of said and other disadvantages.

The object of the present invention is a mobile, oil-free multi-stage compressor device which comprises at least a low-pressure stage compressor element with an inlet and an outlet and a high-pressure stage compressor element with an inlet and an outlet, wherein the outlet of the low-pressure stage compressor element is connected to the inlet of the high-pressure stage compressor element through a line, characterized in that said line includes an intercooler which is provided with a controllable fan and that, in addition, the compressor device is provided with a control unit that controls the controllable fan to control the temperature at the outlet of the intercooler on the basis of the dewpoint in said line.

Another advantage is that the compressor installation can always perform at maximum efficiency, under all ambient conditions, without any risk of condensate development in said line.

As a result, the coating on the rotors of the high-pressure stage compressor element is not exposed to condensate or heat.

Moreover, this also is a compact solution since no condensate separator is required, which makes it perfectly applicable in a mobile compressor device.

An additional advantage is that the control unit will also offer the opportunity to allow for the ambient parameters and the pressure in the line between the low-pressure stage and the high-pressure stage compressor element, which influences the dewpoint, so this can be taken into account when the mobile compressor device is used at high altitude.

It should be noted here that the dewpoint in said line upstream and downstream of the intercooler will be equal or almost equal.

Preferably, the compressor device is provided with an internal combustion engine which will drive the compressor elements and a generator, which generator will supply power for the controllable fan, in particular for an electric motor with which the fan is provided.

This will allow driving the fan without having to couple it directly to the internal combustion engine, thus eliminating the need for a fan with a fixed speed ratio.

It is also possible to arrange this differently, for instance by providing the compressor device with a drive in the form of an electric motor which will drive the compressor elements, wherein the electric motor is supplied by a power mains which will also drive the controllable fan.

In a practical embodiment, the controllable fan is provided with a frequency controller or an rpm controller with variable speed.

This means that the fan is controllable because its rpm is controllable. This control system will control the cooling capacity of the intercooler.

Of course, it is not ruled out to provide, instead of a controllable fan with frequency controller, a so-called controllable on/off fan which can be controlled by switching it on and off at certain times.

The invention also relates to a method for controlling a mobile oil-free compressor device according to the invention, characterized in that the method comprises the following steps:

- determining the dewpoint in said line;
- calculating a preset temperature which equals the dewpoint increased by a certain margin;
- controlling the controllable fan so that the temperature in said line downstream of the intercooler becomes equal to said preset temperature.

Of course, the advantages of such a method are the same as those of the device according to the invention.

Preferably, the method for determining the dewpoint includes the following steps:

- measuring or determining the ambient temperature, pressure, and relative humidity, and/or the relative humidity with an additional sensor in said line downstream of the intercooler;
- measuring or determining the temperature in said line downstream of the intercooler and measuring or determining the pressure in said line;
- calculating the dewpoint in said line (6) on the basis of one or more of said measured or determined parameters;

Measuring or determining the temperature in said line must always take place downstream of the intercooler. Determining or measuring the pressure may optionally take place upstream or downstream of the intercooler. Measuring the pressure downstream of the intercooler has the advantage that any pressure drop across the intercooler may also be reckoned with, which allows a more precise determination of the dewpoint.

Controlling the fan on the basis of the preset temperature rather than the dewpoint has the advantage that the fact can be reckoned with that the temperature of the air to be cooled in the intercooler is not the same everywhere. This means that the wall that separates the air to be cooled from the air to be displaced by the fan is colder than the air to be cooled. Consequently, condensate may be formed, even if the temperature of the air itself is equal to or a little higher than the dewpoint.

Introducing a certain margin may avoid this. It is not ruled out that this margin may be adjusted on the basis of historic measurements or observations, for instance of condensate development or efficiency measurements.

Preferably, measuring or determining the ambient temperature and relative humidity takes place with the aid of an inlet sensor, or a group of sensors, which measure the ambient parameters, and/or measuring or determining the temperature in said line downstream of the intercooler and measuring or determining the pressure and the relative humidity in said line takes place with the aid of a sensor which measures the temperature in the line downstream of the intercooler, a sensor which measures the relative humidity in the line, and a sensor which measures the pressure in said line.

BRIEF DESCRIPTION OF THE DRAWINGS

With a view to better demonstrating the characteristics of the invention, below, by way of example without any restrictive character, some preferred embodiments are described of a mobile oil-free multi-stage compressor device according to the invention and the method used in this connection, with reference to the attached drawings, in which.

DETAILED DESCRIPTION OF THE INVENTION

Figure 1:
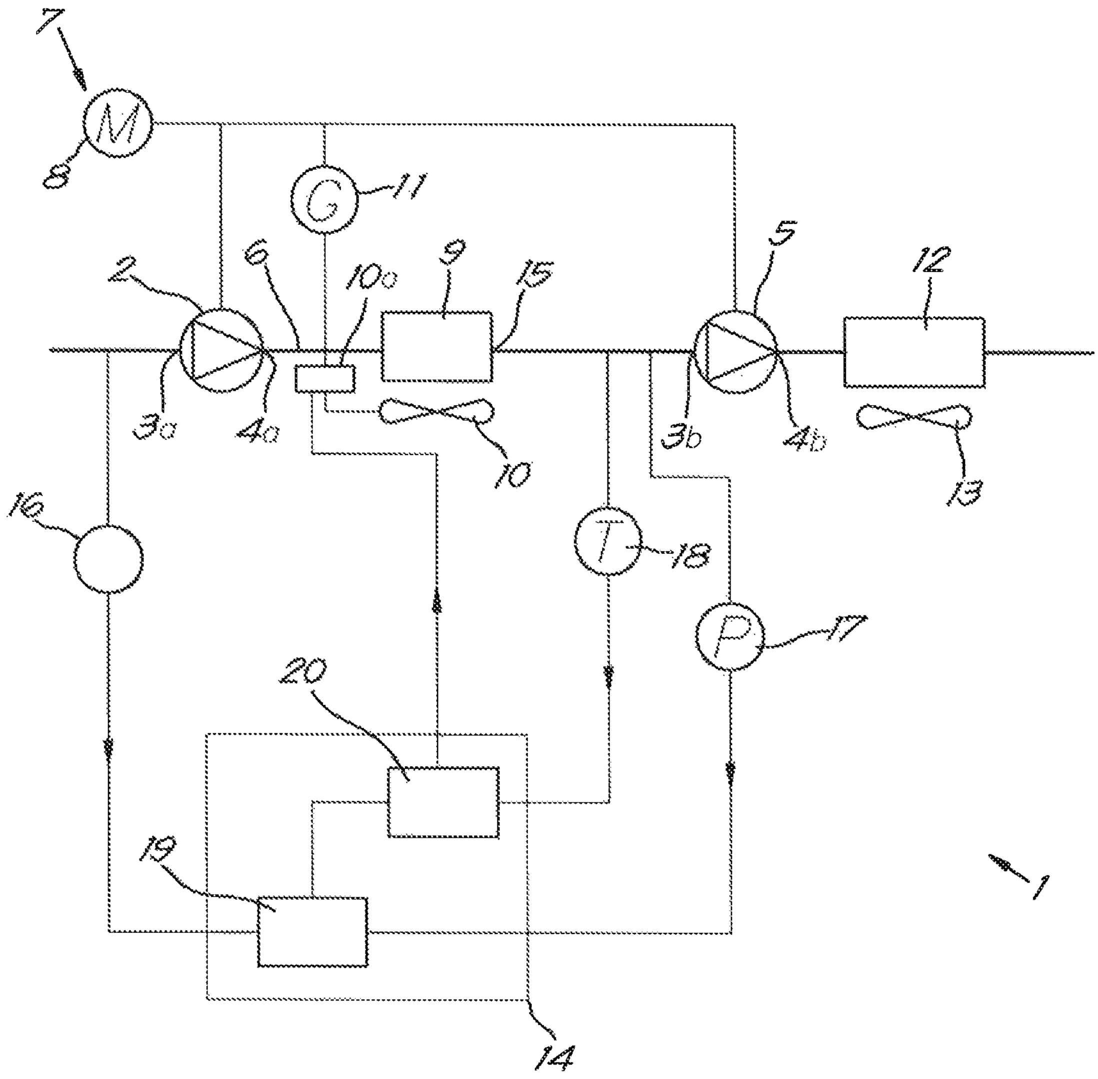
FIG. 1 schematically shows a device according to the invention.

The mobile oil-free multi-stage compressor device 1 in FIG. 1 mainly comprises a low-pressure stage compressor element 2 with an inlet 3*a* and an outlet 4*a* and a high-pressure stage compressor element 5 with an inlet 3*b* and an outlet 4*b*.

Outlet 4*a* of low-pressure stage compressor element 2 is connected to inlet 3*b* of high-pressure stage compressor element 5 through a line 6.

According to the invention it is not ruled out that there still is a third stage, i.e., that high-pressure stage compressor element 5, is followed by a next high-pressure stage compressor element 5'.

In addition, compressor device 1 is provided with a drive 7 in the form of an internal combustion engine 8 which will drive compressor elements 2, 5.

According to the invention, said line 6 is provided with an intercooler 9 for cooling the gas in line 6.

This intercooler 9 is provided with a controllable fan 10, which will allow control of the cooling capacity or the cooling power of intercooler 9 by controlling fan 10.

For control of this fan 10, compressor device 1 is provided with a generator 11, which is driven by said internal combustion engine 8. Generator 11 will supply the electric power for driving fan 10.

Controllable fan 10 is provided with a frequency controller 10*a* or an rpm controller with variable speed, also referred to as "VSD" or "variable speed drive".

Frequency controller 10*a* will be able to control the rpm or the speed of fan 10.

In this case, but not necessary for the invention, compressor device 1 is provided with an aftercooler 12 which is installed downstream of outlet 4*b* of high-pressure compressor element 5.

This aftercooler 12 is provided with a fan 13, which may or may not be controllable.

Finally, compressor device 1 according to the invention is provided with a control unit 14 which will control controllable fan 10 to control the temperature at outlet 15 of intercooler 9 on the basis of the dewpoint in said line 6 increased by a preset margin.

In particular, control unit 14 will control frequency controller 10*a* of fan 10.

Although in the example frequency controller 10*a* is shown schematically separate from fan 10 it does not necessarily have to be that way and this frequency controller 10*a* may also be part of, or be integrated in, fan 10 or in a housing of fan 10.

In addition, in this case an inlet sensor 16 is provided that measures the ambient parameters and which is linked with control unit 14. Instead of this inlet sensor 16, separate sensors may be provided which individually couple every ambient parameter to control unit 14.

The ambient parameters may comprise for instance the temperature, pressure, and relative humidity of air inlet 3*a* of low-pressure compressor element 2.

In addition, in this case compressor device 1 is provided with a sensor 17 and a sensor 18 which measure the pressure, respectively the temperature, in line 6 downstream of intercooler 9 and which are coupled with control unit 10. It is not ruled out that sensor 17 measures the pressure in line 6 upstream of intercooler 9.

If sensor 17 provides a relative pressure measurement, it is not necessary that inlet sensor 16 measures the ambient pressure.

It is also possible that the compressor device is provided with a sensor that measures the relative humidity in line 6.

The operation of compressor device 1 is very simple and as follows.

During operation of compressor device 1, internal combustion engine 8 will drive both compressor elements.

Low-pressure stage compressor element 2 will suck in and compress gas through its inlet 3*a*.

It is known that, while compressing the gas, heat will be generated.

The gas will be cooled down in intercooler 9 before it is guided through line 6 to inlet 3*b* of high-pressure stage compressor element 5 where the gas will be submitted to a next compression operation.

The compressed gas that leaves high-pressure stage compressor element 5, will be cooled down by aftercooler 12 before it is delivered to a network of high-pressure gas or to end-users of high-pressure gas.

For controlling the temperature at outlet 15 of intercooler 9 such that no condensate will develop in the gas in line 6, frequency controller 10*a* of controllable fan 10 will be controlled by control unit 14, while generator 11 will provide the drive for controllable fan 10.

The control to be observed by control unit 14, is as follows.

Firstly, the ambient parameters are determined or measured by inlet sensor 16 and transmitted to control unit 14.

On that basis and on the basis of the pressure in line 6 downstream of intercooler 9 as measured by sensor 17, it will calculate a dewpoint.

Alternatively, it is also possible to determine the dewpoint in line 6 on the basis of the measurements of the sensor which measures the relative humidity in line 6, if compressor device 1 is equipped with it, and the temperature measurement of said sensor 18 which measures the temperature in line 6.

On the basis of this dewpoint, a preset temperature will be determined which is equal to the dewpoint increased by a certain margin.

This is done in accordance with the example shown in FIG. 1, in computing unit 19, which is part of control unit 14.

Subsequently, this preset temperature is compared with the temperature in line 6 downstream of intercooler 9 measured by sensor 18.

This is done according to the example shown in FIG. 1 in computing module 20, which is part of control unit 14.

Based on this comparison, control unit 14 will control fan 10 to ensure that the temperature in said line 6 downstream of the intercooler 9 becomes equal to said preset temperature.

In doing so, control unit 14 will control the speed of fan 10 by controlling frequency controller 10*a*.

When the preset temperature is lower than the temperature measured by sensor 18, control unit 14 will increase the speed of fan 10 and, consequently, also the cooling capacity of intercooler 9, and vice versa.

Another option is that fan 10 is an on/off fan, wherein in this case control unit 14 will switch on fan 10 when the preset temperature is lower than the temperature measured by sensor 18 or will switch off fan 10 when the preset temperature is lower than the temperature measured by sensor 18.

Figure 2:
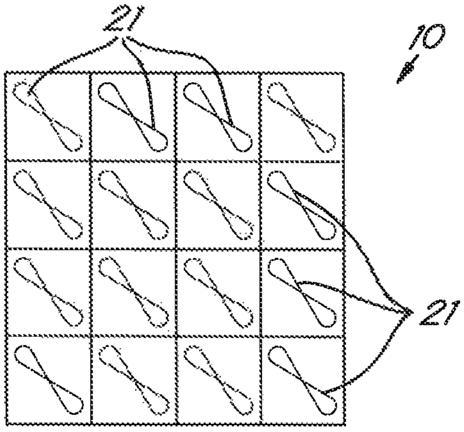
FIG. 2 schematically shows an alternative embodiment of the controllable fan from FIG. 1

FIG. 2 shows a variant of fan 10 according to FIG. 1, wherein in this case controllable fan 10 is composed of various controllable subfans 21.

In the example of FIG. 2 there are 16 subfans 21, but that could also be more than or fewer than 16.

It is possible that at least one subfan 21 or every subfan 21 is provided with an individual frequency controller 10*a* or rpm control with variable speed.

It is also possible that all subfans 21 are controlled by the same frequency controller 10*a*. Or that a number of the subfans 21 are controlled by a first frequency controller 10*a* and some other ones are controlled by a second frequency controller 10*a*.

It is also possible that only some subfans 21 are cooling cooler 9 and that some other subfans 21 are cooling one or more other coolers of compressor device 1.

It is also possible for the embodiment of fan 10 from FIG. 1, that this fan 10 is assisting in cooling one or more other coolers of the compressor device 1.

Figure 3:
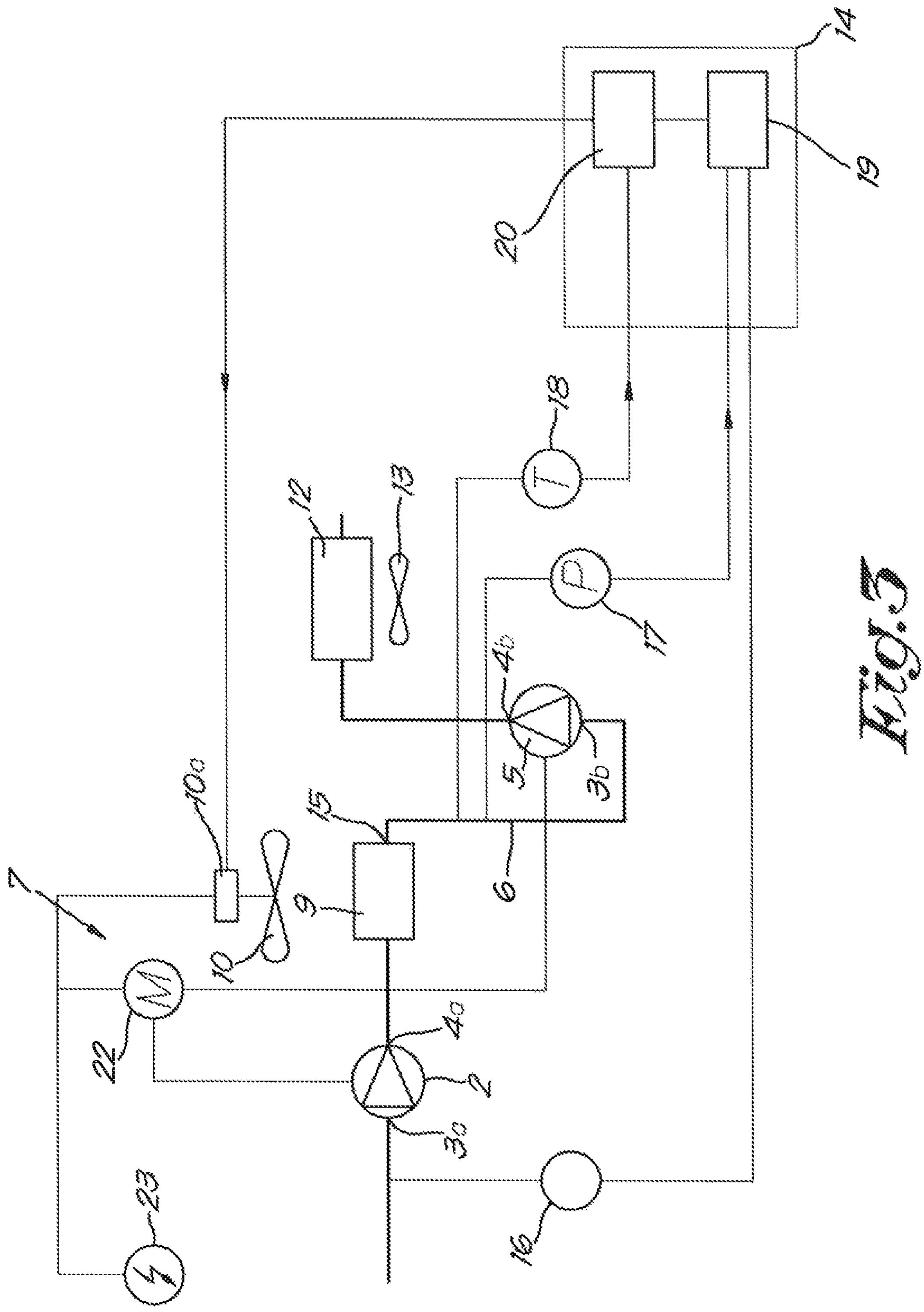
FIG. 3 schematically shows an alternative embodiment of FIG. 1.

FIG. 3 is a variant of FIG. 1 wherein in this case compressor device 1 is provided with a drive 7 in the form of an electric motor 22 which will drive compressor elements 2, 5. A power mains 23 provides power for electric motor 22 and for controllable fan 10.

It is not ruled out that controllable fan 10 is designed as shown in FIG. 2, wherein some of the subfans 21 will cool intercooler 9, while some other fans will cool aftercooler 12, while fan 13 is omitted.

Otherwise, the operation of compressor device 1 is similar to the operation described above.

The present invention is by no means limited to the embodiments as described and as shown in the figures by way of example, but a mobile oil-free multi-stage compressor device according to the invention and the method used, may be realized in all variants without going beyond the framework of this invention.

The invention claimed is:

1. A mobile oil-free multi-stage compressor device which comprises:

an oil-free low-pressure stage compressor element with an inlet and an outlet; and an oil-free high-pressure stage compressor element with an inlet and an outlet, wherein the outlet of the low-pressure stage compressor element is connected to the inlet of the high-pressure stage compressor element through a line, wherein said line includes an intercooler which is provided with a controllable fan, and wherein the compressor device is provided with a control unit that is configured to control the controllable fan to control the temperature at an outlet of the intercooler on the basis of a dewpoint in said line by:

determining the dewpoint in the line, calculating a preset temperature which equals the dewpoint increased by a certain margin such that the preset temperature is higher than the dewpoint, comparing the temperature at the outlet of the intercooler with the preset temperature higher than the dewpoint, and controlling the controllable fan by:

increasing the speed of or switching on the controllable fan when the preset temperature higher than the dewpoint is lower than the temperature at the outlet of the intercooler, and decreasing the speed of or switching off the controllable fan when the preset temperature higher than the dewpoint is higher than the temperature at the outlet of the intercooler, so that the temperature in the line downstream of the intercooler becomes equal to the preset temperature higher than the dewpoint.

2. The mobile oil-free multistage compressor device in accordance with claim 1, wherein the compressor device is provided with a drive in the form of an internal combustion engine which is configured to drive the compressor elements and a generator, which generator is configured to supply power to said controllable fan.

3. The mobile oil-free multistage compressor device in accordance with claim 1, wherein the compressor device is provided with a drive in the form of an electrical motor which is configured to drive the compressor elements, and wherein said electrical motor is powered by power mains which are configured to also drive said controllable fan.

4. The mobile oil-free multistage compressor device in accordance with claim 1, wherein said controllable fan is provided with a frequency controller or RPM control with variable speed.

5. The mobile oil-free multistage compressor device in accordance with claim 1, wherein said controllable fan is composed of various controllable subfans.

6. The mobile oil-free multistage compressor device in accordance with claim 5, wherein at least a first subfan is provided with its own frequency controller or RPM control with variable speed.

7. The mobile oil-free multistage compressor device in accordance with claim 1, wherein said compressor device is provided with an aftercooler which is installed downstream of the outlet of the high-pressure compressor element.

8. The mobile oil-free multistage compressor device in accordance with claim 1, wherein said compressor device is provided with an inlet sensor, or a group of sensors which measures the ambient parameters and which is linked with said control unit and/or compressor device is provided with a sensor which measures a pressure in said line, with a sensor which measures a relative humidity in said line, and/or with a sensor which measures a temperature in said line downstream of the intercooler which are both linked with the control unit, wherein measurements of the inlet sensor and the pressure measurement of said sensor are used for determining the dewpoint in said line or wherein the measurements of the sensor which measures the relative humidity in said line and the temperature measurement of said sensor are used for determining the dewpoint in said line.

9. A method in accordance with claim 1, wherein for determining the dewpoint in said line, the method comprises the following steps: measuring or determining the temperature, pressure, and relative humidity of the surroundings and/or the relative humidity with an additional sensor in said line downstream of the intercooler; measuring or determining the temperature in said line downstream of the intercooler and measuring or determining the pressure in said line; and calculating the dewpoint in said line on the basis of one or more of said measured or determined parameters.

10. The method in accordance with claim 9, wherein determining the ambient parameters comprising the temperature and relative humidity takes place with the aid of an inlet sensor, or a group of sensors, which measures the ambient parameters and/or for determining the temperature in said line downstream of the intercooler and for determining the pressure and the relative humidity in said line, use is made of a sensor which measures the temperature in line downstream of intercooler, of a sensor which measures the relative humidity in line, and a sensor which measures the pressure in said line.

* * * * *